2,895,803

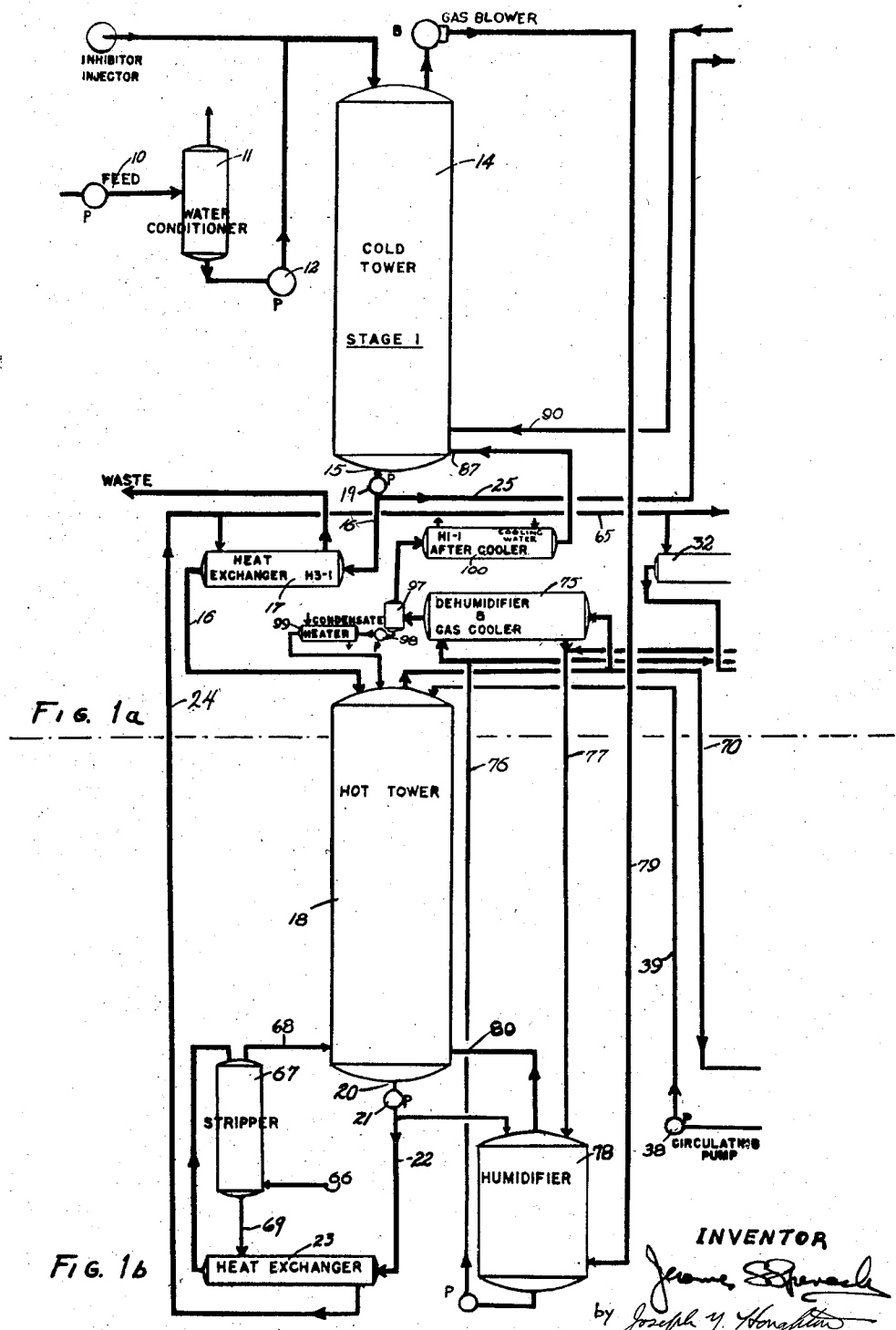

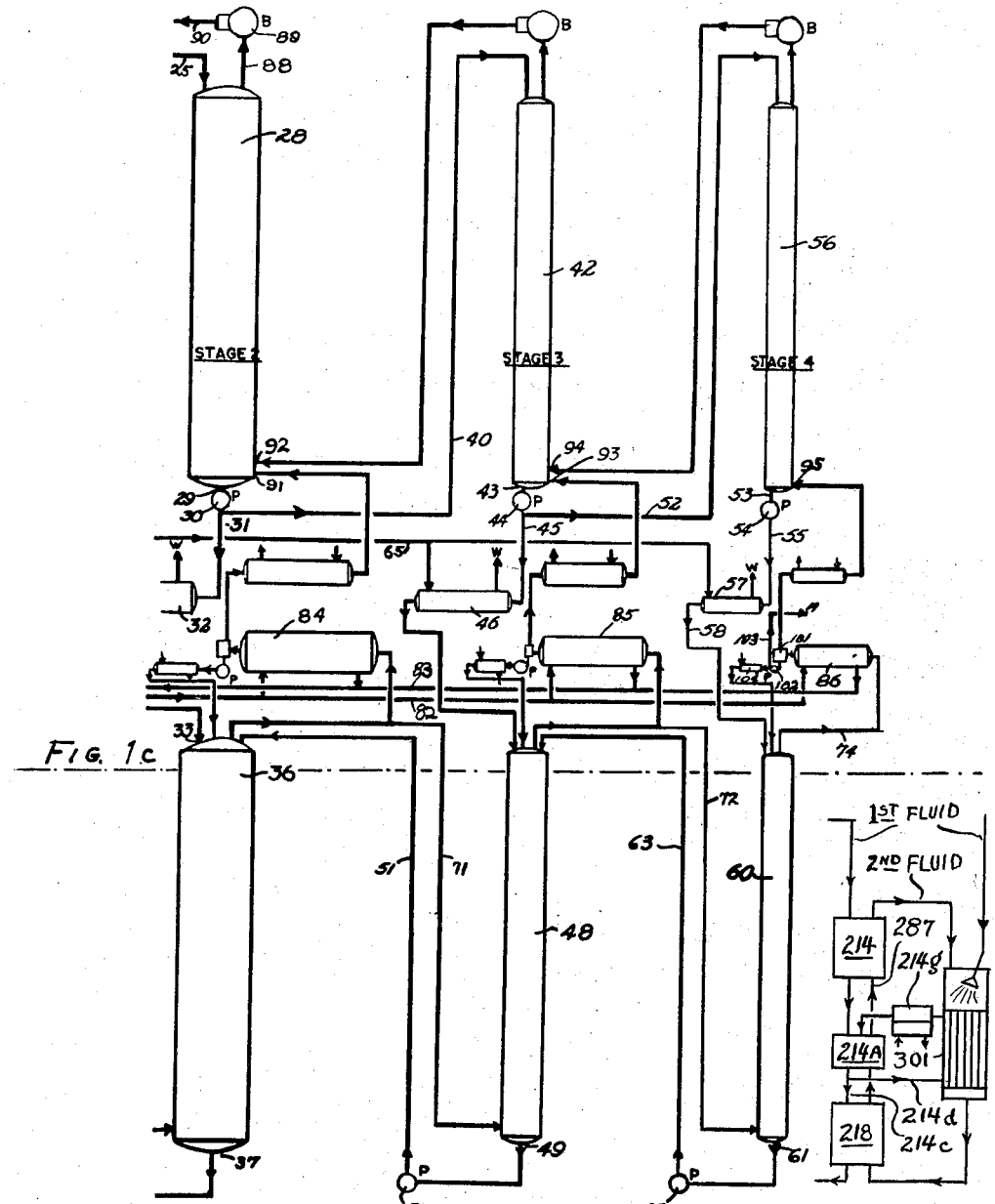

ISOTOPE CONCENTRATION SYSTEM

Jerome S. Spevack, New Rochelle, N.Y.

Application September 29, 1950, Serial No. 188,925

14 Claims. (Cl. 23—204)

This invention relates to systems for the concentration of isotopes and particularly to such systems in which the isotopic equilibrium exchange between two substances is different at different temperatures.

In such systems, for instance, as disclosed in my co-pending application Serial No. 509,581, now Patent No. 2,787,526, granted April 2, 1957, each stage of a cascade employs a cold tower and a hot tower and the progress of the exchange reactions through the system has required alternate and repeated cooling and heating of the substances involved in a very costly manner. These temperature reversals taken with the humidity variations have constituted the outstanding factors in the operating costs and have been determinative of the practicability of the system.

The object of this invention is to provide an isotope exchange system of this type in which the temperature and humidity controls will be exercised in a simple efficient manner economizing on the energy to be supplied and greatly reducing the cost of operation while at the same time maintaining the rate and quality of output.

Further objects of the invention, particularly in integrating the successive stages to cooperate by interchange between them in both the hot and cold reactions and reduce dependence on extraneous supplies of heat and cold, will appear from the following specification taken in connection with the accompanying drawing in which:

Figs. 1a, 1b, 1c, and 1d show connected parts of a flow diagram illustrating the operations under the present process; and Fig. 2 shows a similar flow sheet illustrating a modification.

The system is typically illustrated in connection with the concentration of deterium by countercurrent reactions at contrasting high and low temperatures. The reactants are hydrogen sulfide gas ($H_2S$) and liquid water ($H_2O$).

Both of these substances contain hydrogen, which is capable of undergoing a reversible isotopic exchange reaction. In such a reaction an equilibrium is established between the light and heavy hydrogen isotopes. Since the mechanism of the exchange reaction is ionic, no catalyst is required.

The process at each stage makes use of two towers, a cold temperature tower and a hot temperature tower. The isotopic exchange reactions involved are:

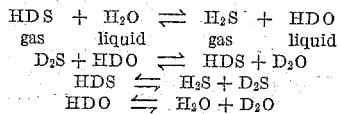

Equilibrium conditions favor concentration of the deuterium in the water phase with a greater concentration effect occurring at the lower temperature. Proper operation of the process gives rise to a concentration gradient in the towers and causes an accumulation of deuterium as heavy water at the bottom of the cold tower.

Feed water enters the system at the top of the cold tower, passes through the cold tower into the top of the hot tower, and leaves as waste from the bottom of the hot tower which waste may in turn be used as the supply to a separate subsequent system. Hydrogen sulfide gas is continuously recycled from the top of the cold tower to the bottom of the hot tower, always flowing countercurrent to the water. Suitable heat exchangers are provided to heat or cool the gas and liquid streams before their entry into the towers.

In each stage the cold tower acts as the concentrating tower. Inasmuch as equilibrium conditions favor the presence of deuterium in the water phase, then as the water stream passes through the cold tower it becomes enriched in deuterium, while the hydrogen sulphide stream becomes depleted. Depletion of deuterium in the gas stream continues to a point where at the top of the cold tower it approaches its equilibrium concentration with the feed water.

The function of the hot tower is the reverse of the cold tower. This tower acts as a deuterium stripper, and thereby provides deuterium reflux to the cold tower. Since the equilibrium constant at the hot tower temperature is not as favorable to deuterium concentration in the water, the water which has passed into the hot tower from the cold tower is obliged to return its excess deuterium to the hydrogen sulphide stream. This redistribution of deuterium from liquid to gas goes on through the entire length of the hot tower and continues to a point where at the bottom of the hot tower the water approaches its equilibrium concentration with the hydrogen sulphide. Therefore, since the quantity of deuterium entering with the hydrogen sulphide at the bottom of the hot tower is essentially the same as that which has left the top of the cold tower, and since the liquid and gas streams tend to approach equilibrium with each other at either end of the system, then the deuterium concentration in the water leaving the hot tower must be less than its concentration in the feed water which enters the cold tower.

By repeated operation, this mechanism causes a growing accumulation of deuterium at the bottom of the cold tower and thereby enables the continuous removal of a concentrated product.

The supply of water (Fig. 1a) enters at 10 and passes through water conditioner 11 and pump 12 to the top of the cold tower 14 of the first stage. As hereinafter explained, there is a countercurrent of gas ($H_2S$) passing upward in this tower 14, the temperature of this cold exchange reactor being maintained at about 20°C., for instance, for a pressure of 5 atmospheres.

The cold liquid discharged at 15 at the bottom of the tower by pump 19 is divided, one portion going by conduit 16 through heat exchanger 17 to be heated thereby and passed on to the top of the hot tower 18 of this first stage. Here again there is a countercurrent of gas for the hot (80° C.) exchange reaction and the hot liquid discharged at 20 at the bottom of the tower is passed by pump 21 and conduit 22 through stripper 67 and heat exchanger 23 removing the gas ($H_2S$) from the liquor and raising the temperature of the liquor which then passes through conduit 24 to heat exchanger 17 where it serves to raise the temperature of the first stage liquid passing from the cold to the hot tower. The discharge of this circulation of heating liquid from exchanger 17 passes to waste.

The other portion of the cold liquid discharged from the cold tower at 15 passes by conduit 25 to the top of the cold tower 28 of the second stage for the cold (20° C.) reaction with the upward sweeping countercurrent of gas and the cold liquid discharged at 29 passes through pump 30 and in part through pipe 31 and heat exchanger 32 raising the temperature of the liquid for entry at 33 into the hot tower 36 where it meets the countercurrent of gas, this hot reaction being at about 80° C. and discharging the hot liquid at 37 to pump 38 passing the liquid through pipe 39 to the top of the hot tower 18 of the preceding stage.

The remainder of the cold discharge from tower 28 passes by piping 40 to the top of the cold tower 42 of the third stage where it is reacted by the countercurrent gas and discharged at 43 to be passed by pump 44 and by piping 45 to heat exchanger 46 raising its temperature for discharge through piping 47 to the top of hot (80° C.) tower 48 and is subjected to reaction with the countercurrent gas and discharge at 49 through pump 50 passing the hot liquid through piping 51 to the top of the next preceding hot tower 36.

The other part of the cold discharge from tower 42 passes by pipe 52 to the top of the fourth stage cold tower 56 at 20° C. where it reacts with the countercurrent gas and is discharged at 53 through pump 54 and piping 55 to heat exchanger 57 and piping 58 to the hot tower 60. The discharge of hot liquid from this tower at 61 is passed by pump 62 and piping 63 to the top of the hot tower 48 of the preceding stage, completing the circuit of the liquid within the system unless additional stages are found advantageous.

No temperature treatment is required for the liquid flows to the cold towers assuming an initial supply at the right temperature and the liquids supplied to the hot towers are raised in temperature by the waste discharge from the primary hot tower 18, waste pipe 24 being connected to feed pipe 65 leading to the heat exchangers 32, 46 and 57 of the second, third and fourth stages respectively. The temperature regulation of the liquid is thus provided from sources within the system and additional steam is only drawn upon in connection with the final stripping of the discharge liquor at 67 and return of the separated gas to the hot tower 18.

This stripping is another feature of the improved process wherein the gas ($H_2S$) is removed from the waste liquor. This is accomplished in a simple but effective way at essentially no extra energy expense. The amount of process steam that is still required by the plant to make up for process inefficiencies and to complete the gas heating and humidification at the various stages as hereinafter explained, is put to an additional use before it enters the hot tower 18. This steam entering at 66 is passed countercurrent to the processed waste liquor in the contact stripping tower 67. In this manner the dissolved hydrogen sulphide is removed from the waste liquor and swept back through outlet pipe 68 to the hot tower 18 together with the steam. Stripping efficiency which leaves less than one part per million residue may be attained. The hot liquid discharge at 69 from stripper 67 is circulated in heat exchanger 23 to increase the temperature of the waste liquor supply to the subsequent heaters 17, 32, 46 and 57 for the liquid entering the hot towers, the liquor being raised, for instance, from 80° C. in circuit 22 to 85° C. in conduit 24.

The conditioning of the countercurrent gas (for instance $H_2S$) is attained with utmost economy. The gas supplies to the cold towers is efficiently cooled and dehumidified and the gas supply to the first stage hot tower is heated and humidified with interchange of energy between these operations while the hot towers of the remaining stages receive their supplies from the hot towers of the previous stages, so that all treatment of the gas supplies to the second, third and fourth hot towers is dispensed with.

This results in a type of cascade system which integrates the plant so that each stage is not an independent unit but is a working part of the overall system. The hot humidified gases required at the bottom of the second stage hot tower 36 are obtained through piping 70 from the hot gases leaving the hot tower 18 of the first stage, and all of the hot liquor from the hot tower 36 of the second stage returns by piping 39 to the hot tower 18 of the first stage. Similarly hot tower 48 receives its gas supply from preceding hot tower 36 by piping 71 and returns to tower 36 its hot liquor discharge by piping 51, while hot tower 60 receives its hot gas through pipe 72 from the preceding hot tower 48 and returns to tower 48 its hot liquid discharge through pipe 63.

The final discharge of hot gases from fourth stage hot tower 60 pass out through piping 74 to subsequent conditioning treatment and is then used to supply the countercurrent gas to cold tower 56 of the fourth stage.

An important aspect of the present system is the recovery and use of the low level energy which is available in the cooling and dehumidification of the hot gases leaving the hot towers to condition these gases for countercurrent use in the cold towers. Instead of cooling these hot gases with cooling water and wasting the heated water the latter is circulated in a cyclic treatment reclaiming the heat and using it for heating and humidification.

The hot gases from the tower 18 must be cooled and dehumidified before they can be used in the cold tower 14 of this first stage and the same problem is presented at each following stage. A supply of these hot gases from tower 18 on their way to the cold tower 14 are passed through the dehumidifier and gas cooler 75 which is cooled by water supplied by pipe 76. This water raised in temperature is fed by pipe 77 to the top of a special humidifier tower 78 and through this tower 78 the cold gases brought by pipe 79 from first stage cold tower 14 are passed in direct contact countercurrent to the hot water. By this efficient direct contact method the cold gases are simultaneously heated and humidified while the circulating liquor is cooled. The hot humidified gases are passed by pipe 80 into the hot water 18. The cooled liquor is recirculated to the dehumidifier and cooler 75 to pick up another charge of energy for delivery to the humidifier 78. Inasmuch as the liquid circulates in a closed cycle 75, 77, 78, 76, there is no effect upon the deuterium concentration in the gas stream which enters the hot tower. A small amount of make-up water is continuously added to this liquor cycle in order to replace that portion which is consumed in humidification of the gas stream. This may conveniently be drawn from the discharge pipe 22 from hot tower 18 or from the feed, etc.

A further advantage of the system is that all of the energy from the dehumidifiers of all of the stages is available for humidification and gas heating in the humidifier 78 of the first stage. These stages two, three and four receive their hot gases direct from the preceding stage in each case and so humidifiers for these stages are dispensed with. In each of these stages the corresponding dehumidifier and cooler 84, 85, 86 intervening in the gas passage between the hot tower and the cold tower is cooled by circulation from pipe 82, drawing its supply from pipe 76, and pipe 83 returning the discharges to pipe 77 so that these dehumidifiers 84, 85, 86 of these subsequent stages are in circuit with the cyclic circulation through humidifier 78 and supply energy thereto.

The cooled gases from hot tower 18 pass into the bottom of cold tower 14 at 87 and are joined there by the cold gases brought from the cold tower 28 by pipe 88, gas pump 89 and pipe 90. Similarly the cold tower 28 is supplied at 91 with cooled gases from hot tower 36 and at 92 with cold gases from tower 42, while tower 42 receives cooled gases at 93 from hot tower 48 and at 94 is supplied with cold gases from cold tower 56, which latter tower receives its supply of gases at 95 solely from hot tower 60.

In addition to the dehumidifying and cooling of the hot gases at 75, 84, 85, 86, they may be subjected to a separating action as in separator 97 of stage one receiving the discharge from cooler 75 and separating out the liquid which is passed by pump 98 to heater 99 and delivered into the top of the hot tower 18. The energy for heater 99 is supplied from an outside source. The gas discharge from separator 97 being further cooled in aftercooler 100 supplied with cooling circulation from any suitable source, the condensate from this aftercooler is carried into tower 14 with the gas stream. Similar condensers and coolers may be provided at the subsequent stages as shown.

In the final stage the separator 101 separates out the liquid content of the gases from condenser 86 and pump 102 delivers the condensate to discharge pipe 103 and heater 104 from which the liquid raised in temperature is returned to the hot tower 60.

The condensate drawn off in discharge pipe 103 as the product of this primary plant is high in concentration of HDO and $D_2O$ and may serve as a supply for further concentration in additional stages or another system if desired.

The overall process relies on ordinary water as the deuterium source; the gas, hydrogen sulphide, merely acts as an exchange medium and is recycled without being consumed. Make-up gas in small amounts may be supplied preferably at the entrance to the cold tower of the first stage.

The diagrammatic showing and descriptions herein are merely illustrative and descriptive of the plant and process operation and changes in tower height, number of stages, temperature of operation, pressure of operation, the kinds of substances used, the particular isotope to be concentrated, the use of catalysts to enhance rate of isotope exchange, variations of design within a countercurrent temperature exchange and other details may be resorted to within the principle of the invention.

In any system of heat recovery between the fluids entering and either leaving the hot or cold temperature exchange there may be continuous intimate physical contact between said fluids at only a single end of said temperature exchanges. This direct contact is thus limited to a single exchange in order to prevent any isotopic redistribution between the isotope enriched fluids and depleted fluids. Accordingly, the system described herein has made use of the very efficient direct intimate contact methods of heat transfer together with the indirect non-contacting methods as required for this process. For example, in Figs. 1a to 1d the energy available from the gas leaving the hot tower is transferred by heat exchange (indirect contact) to water which in turn transfers the energy by direct contact (intimate mixing in a countercurrent tower) with the gas entering the bottom of the hot tower. In this way it is possible to simultaneously heat and humidify the gas entering the hot tower.

Another modified system may be employed in which the heat exchanges between the hot and cold flows are in general the reverse of those employed in Figs. 1a and 1b. This modification method makes use of a heat transfer cycle involving the pick-up of energy from a hot humidified gas by a liquid stream in a countercurrent direct contact, gas cooler dehumidifier tower and the subsequent liberation of this energy from the liquid to a cold gas stream by indirect contact in a countercurrent heat exchanger.

In this method the cold tower 214 may be extended to include a section 214a at its bottom (or a separate tower) which will serve as the direct contact gas cooler-dehumidifier. The cold liquid from the bottom of the cold tower 214 together with an auxiliary flow via 214b passes countercurrent in 214a in contact with the hot humidified gas from the top of the hot tower 218 and becomes heated as the gas is cooled to the cold tower temperature. The cooled gas via 287 then flows upward through the cold tower 214. The hot liquid from the bottom of said direct contacting section 214a is divided. A portion 214c represented by the main cold tower stream plus added condensate is sent to the hot tower and the balance 214d is sent to a heat exchanger 301 through which indirectly it transfers its energy to a mixture of the cold tower gas and a volume of water required for humidification, and thus the cold tower gas outflow 214f is simultaneously heated and humidified, as the liquid in 214c is cooled. To make up for inefficiencies of the heat transfer equipment this liquid is further cooled in 214g as required before returning it to the same direct contacting section 214a via 214b.

With the systems of this invention the operating conditions are readily attained within moderate ranges of the typical values set forth in the following tabulation:

| Temperature: | | | |
|---|---|---|---|
| Cold Towers, ° C | 15 | 20 | 35 |
| Hot Towers, ° C | 70 | 80 | 190 |
| Approx. Operating Pressure (absolute), p.s.i. | 25 | 80 | 275 |
| Gas to liquid ratio (mols $H_2O$ mols $H_2S$ in cold tower) | 2.21 | 2.20 | 1.8 |
| Concentration of deuterium in product from final stage, percent | 2 | 2 | 2 |
| Number of stages | 4 | 4 | 4 |
| Ratio of liquid flow of a succeeding stage to a preceding stage | 1/4 | 1/4 | 1/4 |
| Concentration of deuterium in feed water, percent | .0143 | .0143 | .0143 |
| Recovery of deuterium from feed water, percent | 12 | 12 | 21 |

The enrichment at which the product may be removed from the system is not dependent on the operating temperatures alone. It is determined by the overall contacting efficiency of the countercurrent towers which in turn is dependent upon the efficiency of the individual bubble plates or contacting members within the towers. For bubble plate towers of the standard design generally obtained, approximately 80 plates per tower would be required for conditions set forth above.

The molar ratios of total gas to total liquid passing countercurrent in each stage of hot and cold towers are determined so that the corresponding operating lines intervene between the equilibrium curves as represented by the effective fractionation factors for each of the said towers. The effective fractionation factor is the equilibrium ratio of the mol or atom fraction of total deuterium in the gas phase to the mol or atom fraction of total deuterium in the liquid phase at a particular temperature and pressure.

In the design of a multiple stage cascade system the relative cross-sectional area of each stage is governed by fluid flows in that stage. The number of theoretical plates in any stage is determined by the fluid flow rates, the deuterium extraction efficiency of that stage, the desired enrichment for that stage and the net enriched deuterium removal from that stage. The concentrations existing at the ends of the towers of each stage are calculated by the mathematical solution of deuterium, water and hydrogen sulphide material balances with allowance for the net deuterium transport to each successive stage of an amount equal to the steady state deuterium extraction from the feed water.

The relative size of flows in each stage are based on economic consideration and such factors as isotopic hold up and equilibrium time.

In the deuterium concentration effected by this system there is also a concentration of the tritium and at a better fractionation factor, the principal isotopic reactions being indicated as follows:

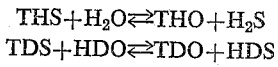

$$THS + H_2O \rightleftarrows THO + H_2S$$
$$TDS + HDO \rightleftarrows TDO + HDS$$

The system of this invention thus provides a practical economical concentration of the desired isotope such as deuterium and with it a concentrate of the tritium.

I claim:

1. A method of producing a substance containing concentrated therein an isotope of an element by exchanging, at two different temperatures, said isotope with another isotope of the same element between chemically different fluid substances which are physically separable from each other and which are capable of containing each of said isotopes, which method comprises (a) establishing a countercurrent flow of the two substances in a series of at least two pairs of exchange units; (b) mixing said two fluids in each of said exchange units to cause an exchange of isotopes of the element between the two fluids; (c) maintaining a first unit of each pair at a temperature to cause the first fluid flowing therethrough to become enriched and the second fluid flowing therethrough to become impoverished with respect to said isotope; and (d) maintaining the second unit of each pair at a temperature to cause the second fluid flowing therethrough to become enriched and the first fluid flowing therethrough to become impoverished with respect to said isotope; (e) transferring a first part of the enriched first fluid from the first unit of each pair to the second unit of said pair and (f) transferring a second part of the enriched first fluid from the first unit of each pair except the last of said pairs to the first unit of the next succeeding pair; (g) transferring a first part of the enriched second fluid from the second unit of each pair to the first unit of said pair and (h) transferring a second part of said enriched second fluid from the second unit of each pair except the last to the second unit of the next succeeding pair of units; (i) transferring impoverished first fluid from the second unit of each pair of units except the first pair to the second unit of the next preceding pair of units; and (j) transferring impoverished second fluid from the first unit of each pair of units except the first pair to the first unit of the next preceding pair of units; and (k) removing as product enriched fluid from the last pair of exchange units of said series.

2. A method according to claim 1, further comprising the step of stripping from the impoverished first fluid leaving the second unit of the first pair of units a content of said second fluid carried thereby in a separate stripping stage, the first fluid being stripped being in liquid phase, the stripping being effected by passing thereinto first fluid in gaseous phase, the uncondensed portions of which are passed with the stripped content of said second fluid to the second unit of said first pair of units, and by also passing the stripped first fluid, and the condensate from the first fluid introduced in gaseous phase, as they leave the stripping stage, in heat exchange relation with the first fluid in liquid phase passing to the stripping stage from the second unit of the first pair of units, whereby the temperature in the stripping stage is substantially higher, and the temperature of the stripped first fluid after said heat exchange is also higher, than the temperature of the first fluid leaving the second unit of said first pair of units.

3. A method according to claim 2, in which a plurality of the enriched first fluid streams being transferred from first units to second units of a plurality of pairs of the series are regeneratively heated by the improverished first fluid stream passing from the stripping stage and by the condensed stripping fluid contained therein.

4. A method according to claim 1 further comprising the steps of bringing an enriched second fluid being transferred from a second unit to a first unit of a pair of units into direct contact heat exchange relation to a cyclic flow of first fluid, and then bringing said cyclic flow into heat exchange relation to a fluid passing from a first unit to a second unit of one of said pairs of units.

5. A method according to claim 4, in which the first fluid is liquid, the second fluid is a gas, and the temperature maintained in the second unit of each pair of units is higher than the temperature maintained in the first unit of said pair; in which impoverished second fluid from the cooler first unit of a pair of units is recirculated to the warmer second unit of said pair of units, in which a quantity of first fluid is introduced into the second fluid being so recirculated from the first unit to the second unit of said pair, and in which said recirculating second fluid with the so introduced quantity of first fluid constitutes at least a part of the fluid passing from a first unit to a second unit with which said cyclic flow is brought into heat exchange relation.

6. A method according to claim 1, further comprising the steps of at least in part cooling the enriched second fluid streams being transferred from second units to first units of a plurality of pairs of units by indirect heat transfer to a body of first fluid, and at least in part heating and saturating the second fluid stream entering the second unit of said first pair of units by direct contact thereof with the so heated body of first fluid.

7. A method according to claim 6, further comprising the steps of replacing the first fluid, lost from said heated body in effecting said saturation, with impoverished first fluid from the second unit of said first pair of units.

8. The method of claim 1, wherein the first fluid is water and the second fluid is hydrogen sulfide.

9. The method of claim 2, wherein the first fluid is water and the second fluid is hydrogen sulfide.

10. The method of claim 3, wherein the first fluid is water and the second fluid is hydrogen sulfide.

11. The method of claim 4, wherein the first fluid is water and the second fluid is hydrogen sulfide.

12. The method of claim 5, wherein the first fluid is water and the second fluid is hydrogen sulfide.

13. The method of claim 6, wherein the first fluid is water and the second fluid is hydrogen sulfiide.

14. The method of claim 7, wherein the first fluid is water and the second fluid is hydrogen sulfide.

References Cited in the file of this patent

Chemical Engineering Catalog, 33rd ed., p. 213 (1948–9). Publ. by Reinhold Publ. Corp., N.Y.